United States Patent
Harbourt et al.

(10) Patent No.: US 9,369,035 B2
(45) Date of Patent: Jun. 14, 2016

(54) POWER CONVERTER AND METHOD OF OPERATION

(75) Inventors: Cyrus David Harbourt, Roanoke, VA (US); Mark Eugene Shepard, Roanoke, VA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 568 days.

(21) Appl. No.: 13/024,940

(22) Filed: Feb. 10, 2011

(65) Prior Publication Data

US 2012/0206841 A1 Aug. 16, 2012

(51) Int. Cl.
*H02H 9/00* (2006.01)
*H02M 1/32* (2007.01)
*H02H 7/12* (2006.01)

(52) U.S. Cl.
CPC .. *H02M 1/32* (2013.01); *H02H 7/12* (2013.01)

(58) Field of Classification Search
USPC .......................................................... 361/54
See application file for complete search history.

(56) References Cited

U.S. PATENT DOCUMENTS

| | | | | |
|---|---|---|---|---|
| 3,973,171 | A * | 8/1976 | Howell | 361/45 |
| 4,943,888 | A * | 7/1990 | Jacob et al. | 361/96 |
| 5,621,628 | A | 4/1997 | Miyazaki et al. | |
| 5,982,646 | A * | 11/1999 | Lyons et al. | 363/58 |
| 8,629,659 | B2 * | 1/2014 | Johnson | 323/210 |
| 2005/0111246 | A1 * | 5/2005 | Lai | H02M 5/225 363/157 |
| 2009/0185319 | A1 * | 7/2009 | Lee | 361/59 |
| 2010/0324747 | A1 * | 12/2010 | Lee et al. | 700/293 |
| 2011/0050136 | A1 * | 3/2011 | Sumi et al. | 318/400.3 |
| 2012/0248874 | A1 * | 10/2012 | Pan | H02J 11/00 307/64 |

FOREIGN PATENT DOCUMENTS

| | | |
|---|---|---|
| CN | 101242136 A | 8/2008 |
| CN | 101345507 A | 1/2009 |
| JP | 6423767 A | 1/1989 |
| JP | 0965658 A | 3/1997 |
| JP | 2000350465 A | 12/2000 |
| JP | 2000354383 A | 12/2000 |

OTHER PUBLICATIONS

Translation of CN 101242136 A. pp. cover & 1-30. Dec. 2015.*
Unofficial English translation of Office Action issued in connection with corresponding CN Application No. 201210034637.3 on Mar. 20, 2015.
Chinese Office Action issued in connection with corresponding CN Application No. 201210034637.3 on Nov. 18, 2015.
Unofficial English Translation of Japanese Office Action issued in connection with corresponding JP Application No. 2012-023566 on Dec. 15, 2015.

* cited by examiner

*Primary Examiner* — Ronald W Leja
(74) *Attorney, Agent, or Firm* — GE Global Patent Operation; Catherine J. Toppin

(57) ABSTRACT

A power converter includes a first phase leg including a first di/dt reactor and a first control section, the first di/dt reactor and the first control section being coupled between an active line and a neutral line. The power converter also includes a first current crowbar coupled between the active line and the neutral and a controller coupled to the first di/dt reactor, the control section and the first current crowbar and configured to activate the current crowbar based on a voltage across the first di/dt reactor.

18 Claims, 3 Drawing Sheets

POWER CONVERTER AND METHOD OF OPERATION

BACKGROUND OF THE INVENTION

The subject matter disclosed herein relates to power converters and, in particular, to protecting power converters from fault currents.

Power converters (also known as inverters) are utilized to convert direct current (DC) into alternating current (AC). Power converters have fault modes that can allow destructively high fault currents to flow through them. The fault currents can be large enough to damage the bus structure of the power converter or destroy or otherwise damage power semiconductors (e.g., integrated gate commutated thyristors (IGCTs)) in the fault path. In order to limit the peak value of the fault current through the power converter and devices therein, the fault current must either be interrupted or diverted.

Fuses are one method of interrupting the fault current. The fuses can be installed between the DC link capacitors and the phase legs of the power converter. Another approach is to utilize a so-called "current crowbar." One type of current crowbar utilizes a high-speed silicon controlled rectifier (SCR) that is turned on in the event of a detected fault current. When the current crowbar is activated it provides a low impedance path that diverts fault current away from the phase legs of the power converter. An activated current crowbar also provides a low impedance pathway for discharging the DC link capacitors.

The gating of the SCR is typically controlled by circuits that sense the rate-of-change of current in a conductor in the DC link assembly. The rate-of-change of current is compared it to a threshold and the current crowbar is activated when the rate exceeds a threshold level. Such a control circuit requires a separate control rack and sensors.

BRIEF DESCRIPTION OF THE INVENTION

According to one aspect of the invention, a power converter is disclosed. The power converter of this aspect includes a first phase leg including a first change of current over time (di/dt) reactor and a first control section, the first di/dt reactor and the first control section being coupled between an active line and a neutral line. The power converter of this aspect also includes a first current crowbar coupled between the active line and the neutral and a controller coupled to the first di/dt reactor, the control section and the first current crowbar and configured to activate the current crowbar based on a voltage across the first di/dt reactor.

According to another aspect of the invention, a method of operating a power converter is disclosed. The method of this aspect includes: receiving a voltage from a change of current over time (di/dt) converter at a controller of the power converter; and activating a current crowbar coupled to the controller in the event that the voltage exceeds a threshold.

According to another aspect of the invention, a method of operating a power converter is disclosed. The method of this aspect includes: receiving a voltage from a change of current over time (di/dt) converter at a controller of the power converter; and activating a current crowbar coupled to the controller in the event that a value calculated from the voltage exceeds a threshold.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide integrated fault current protection for power converters. According to one embodiment, the sensed voltage across a di/dt reactor in a phase leg of the power converter is utilized as a basis for determining the current in the phase leg and triggering the current crowbar if a threshold level for the current is reached. Such an approach may allow for reduced cost and increased simplicity in the power converter and allow for more precise control of the operation of the current crowbar.

Figure 1:
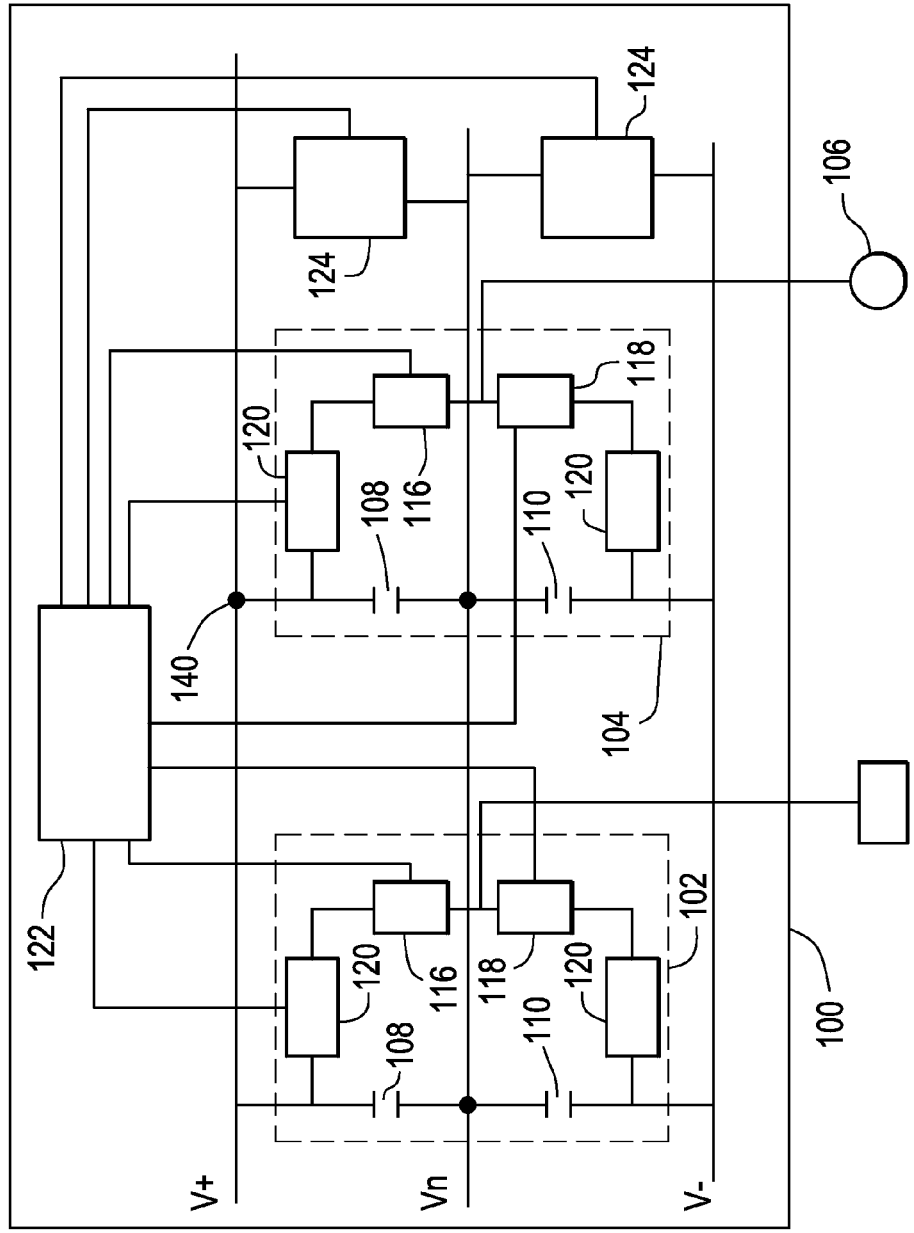
FIG. 1 is block diagram of a power converter including an integrated protection circuit according to an embodiment of the present invention.

FIG. 1 illustrates a power converter 100 according to one embodiment of the present invention. As illustrated, the power converter 100 includes phase legs 102, 104. As one of ordinary skill in the art will realize, the number of phase legs 102, 104 that may be included in the power converter 100 can vary depending on the application. For example, the power converter 100 can include a single phase leg (e.g., phase leg 104) and, as such, operate as a single phase inverter. In another embodiment, the power converter can include two or three (or more) phase legs 104 that are fed by a rectifying bridge (not shown) that receives a multiphase power input. For example, the power converter 100 could be a three level inverter including a 12-pulse source. It shall be understood that the phase leg 102 could be configured to receive AC current, convert it to DC current, and provide it to phase leg 104 for conversion back to AC. Regardless, the one or more of the phase legs 104 are coupled to and drive a load 106. Of course, the number of phase legs 104 may be the same as the number of phases required to drive the load 106 in one embodiment.

Each of the phase legs 102, 104 may be formed in a similar manner and as is generally known. For example, phase leg 104 includes DC link capacitors 108, 110 that, respectively, are coupled between the positive/negative inputs and a neutral. That is, the DC link capacitor 108 is coupled between V+ and Vn and DC link capacitor 108 is coupled between V− and Vn. As illustrated, phase leg 104 includes a positive half 112 and a negative half 114 that are fed, respectively, by V+ and V−. As used herein, V+ and V− may be referred to as "active lines" and Vn may be referred to as a "neutral line" between V+ and V−. DC link capacitors 108, 110, respectively, store power received from V+ and V− and provide it to the load 106. Each phase leg 102, 104 also includes a positive control section 116 and a negative control section 118.

The control sections 116, 118 include, in one embodiment, one or more IGCTs that are triggered and controlled by a controller 122. The control scheme implemented by the controller 122 to operate the IGCTs (or other elements) in control sections 116, 118 can vary depending on the configuration the control sections 116, 118 and as is known in the art. In one embodiment, the power converter 100 contains 12 control sections 116, 118, two for each of six phase legs.

As is known in the art, each phase leg 102, 104 includes two change of current over time (di/dt) reactors 120, that each include at least one inductive element. In the event of failure of, for example, one of the IGCTs in the control section 116, currents though the power converter 100 are only limited by the di/dt reactor 120 and the parasitic resistances of the power connections. As such, currents from the DC link capacitors 108, 110 (as well as any failed device) can rapidly reach destructive levels in the controls section 116.

In the prior art, an additional sensor (not shown) was utilized to measure current in the power converter 100. For example, in the prior art, a current sensor may have been located at node 140. Upon detection of a fault current, a separate controller (not shown) caused the appropriate crowbar 124 to become active and provide an alternative current path for the DC capacitors 108, 110 to discharge to protect the IGCTs in the control sections 114, 116.

In embodiments of the present invention the separate fault current protection sensor/controller of the prior art is not needed. Rather, according to embodiments of the present invention, the controller 122 that controls the control sections 114, 116 can also be used to activate the crowbars 124. In particular, controller 122 monitors the voltage through the di/dt reactors 120. When currents flow through the di/dt reactors 120, the voltage across them is proportional to the rate of change of current through the control sections 114, 116. As such, the measured voltage across the di/dt reactors 120 can be utilized to calculate the current in each half 112, 114 of the phase legs 102, 104 and trigger the appropriate current crowbar 124 if a threshold level for current, or rate of change of current, is exceeded.

It shall be understood that the controller 122 can be any type of computing device. For example, the controller 122 can be a computing device that includes memory for storing instructions that cause it to perform one or more steps of any of the methods disclosed herein. As such, a technical effect of the present invention is the provision of a system and method for controlling a current crowbar utilizing the same controller that controls the phase legs 102, 104 of the power converter 100.

Figure 2:
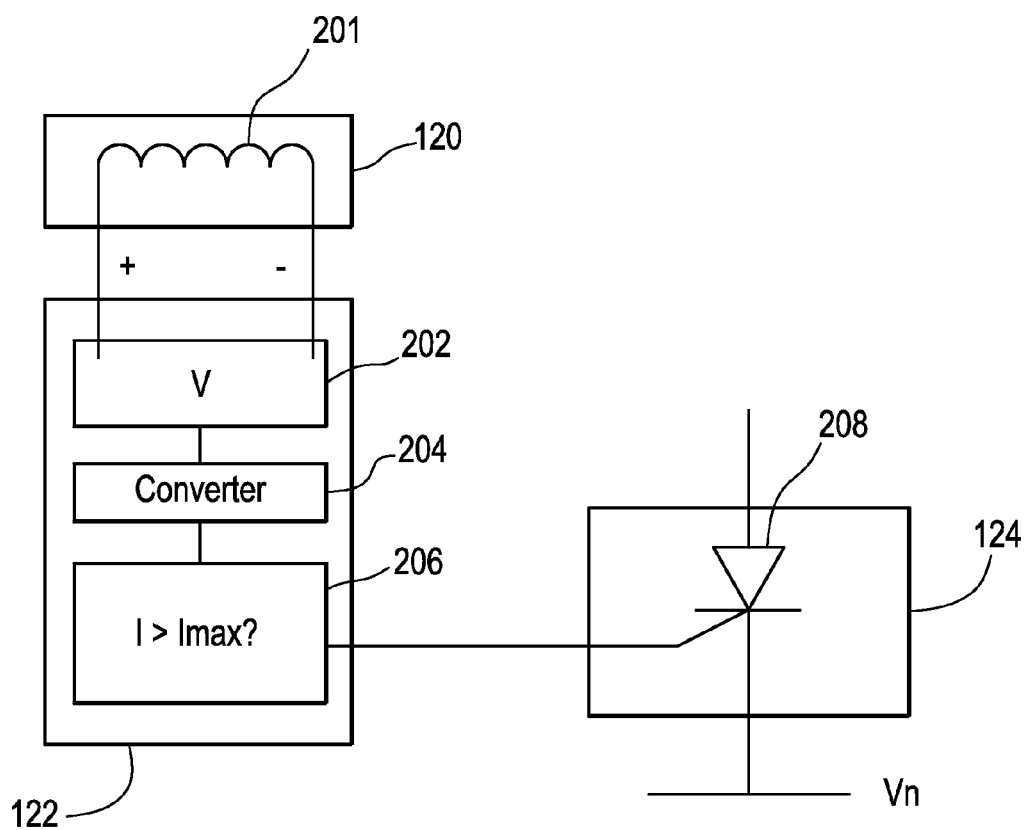
FIG. 2 is a block diagram of a portion of the power converter illustrated in FIG. 1.

FIG. 2 illustrates a portion 200 of the power converter 100 illustrated in FIG. 1. The portion 200 includes one di/dt reactor 120. As described above, in one embodiment each half of each phase leg includes a di/dt reactor 120. The di/dt reactor 120 includes an inductive element 201. The controller 122 includes or is coupled to a voltage sensor 202. The voltage sensor 202 measures the voltage across the inductive element 201. Of course, the inductive element 201 could be formed of one or more inductors of other active elements. In one embodiment, the voltage sensor 202 is implemented as an analog-to-digital converter. In one embodiment, the voltage sensor 202 is a sigma-delta converter. A sigma-delta converter is a specific type of analog-to-digital converter that receives an analog input voltage and converts it into a digital value as is known in the art. The digital value output by the voltage sensor 202 is proportional to the rate of change of current through the inductive element 201. In one embodiment, a converter 204 then integrates the voltage to determine the current through the inductive element 201. A logic block 206 then determines if the current exceeds a threshold value and, if so, provides a gate signal to the gate of an SCR 208 that activates the current crowbar 124. In this manner, the controller 122 that operates the power converter 100 (FIG. 1) also controls the operation of the current crowbar 124.

Figure 3:
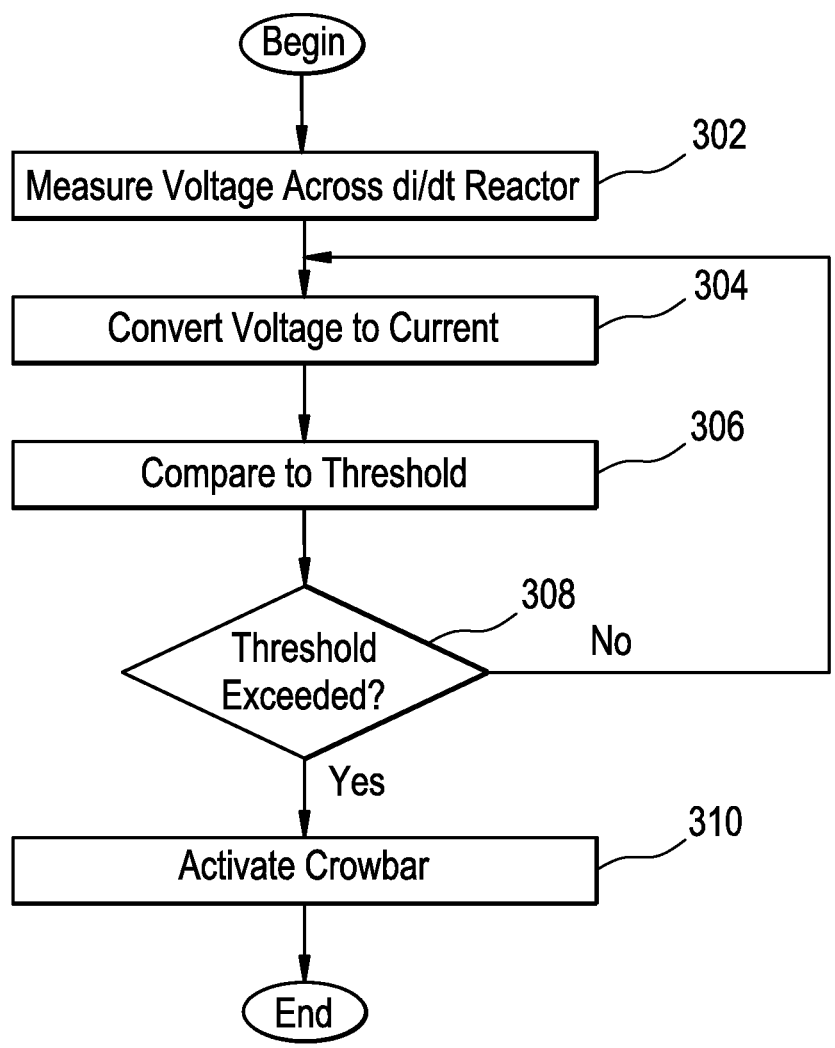
FIG. 3 is a flow chart illustrating a method according to an embodiment of the present invention.

FIG. 3 is a flow chart illustrating a method according to an embodiment of the present invention. At block 302 the voltage across a di/dt reactor contained in a phase leg of a power converter is measured. In one embodiment, a sigma-delta converter is used to perform the measurement. It shall be understood that, in one embodiment, the voltage across several di/dt reactors may be measured. However, for simplicity, a single measurement of a di/dt reactor is considered for this illustration.

At block 304, the measured voltage is converted to a current. In one embodiment, such a measurement includes integrating the voltage over a specified time period. In another embodiment, such a conversion can be omitted and only a scaled rate of current change is utilized in further processing blocks.

At block 306 the current (or scaled rate of current change) is compared to threshold. If the threshold is exceeded (block 308) the crowbar is activated. Otherwise, processing returns to block 304.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A power converter comprising:
a first phase leg including a first change of current over time (di/dt) reactor coupled to a first control section, wherein the first di/dt reactor and the first control section couple an active line to a neutral line;
a first current crowbar coupling the active line to the neutral line; and
a controller coupled to the first di/dt reactor, the first control section and the first current crowbar, the controller configured to control the first control section and to activate the first current crowbar based on a measured voltage across the first di/dt reactor, wherein the controller includes a sigma-delta converter that creates a digital output based on the voltage.

2. The power converter of claim 1, wherein the first di/dt reactor includes:
a first inductive element;
wherein the voltage is measured across the first inductive element.

3. The power converter of claim 1, wherein the controller integrates the digital output to determine a current.

4. The power converter of claim 3, wherein the current is compared to a threshold and the controller activates the current crowbar when the current exceeds the threshold.

5. The power converter of claim 1, wherein the digital output is compared to a threshold and the controller activates the current crowbar when the digital output exceeds the threshold.

6. The power converter of claim 5, wherein the digital output is proportional to a rate of change of the current through the first di/dt reactor.

7. The power converter of claim 1, further comprising:
a DC link capacitor coupling the active line to a neutral line.

8. The power converter of claim 1, wherein the first control section includes one or more integrated gate commutated thyristors (IGCTs).

9. The power converter of claim 1, wherein the active line carries a positive voltage and further comprising:
a negative line that carries a negative voltage; and
a second current crowbar coupling the negative line to a neutral line.

10. The power converter of claim 9, wherein the second phase leg further includes a second di/dt reactor coupled to a second control section, the second di/dt reactor and the second control section coupling the negative line to the neutral line and both the second di/dt reactor and the second control section are coupled to and controlled by the controller.

11. The power converter of claim 1, wherein the first current crowbar includes a silicon controlled rectifier (SCR).

12. The power converter of claim 11, wherein the controller activates the first current crowbar by providing an activation signal to a gate of the SCR.

13. A method of operating a power converter, the method comprising:
providing a change of current over time (di/dt) converter coupled to a control section, wherein the di/dt converter and the control section couple an active line to a neutral line;
receiving a voltage from the di/dt converter at a controller of the power converter; and
using the controller to control the control section and to activate a current crowbar in the event that the voltage exceeds a threshold, wherein the voltage is received at a sigma-delta converter.

14. The method of claim 13, further comprising:
integrating an output of the sigma-delta converter to create the value calculated from the voltage.

15. The method of claim 13, wherein activating includes providing a signal from the controller to a gate of a silicon controlled rectifier within the current crowbar.

16. A method of operating a power converter, the method comprising:
receiving a voltage from a change of current over time (di/dt) converter at a controller of the power converter, wherein the di/dt converter and a control section couple an active line to a neutral line; and
using the controller to control the control section and to activate a current crowbar in the event that a value calculated from the voltage exceeds a threshold, wherein the voltage is received at a sigma-delta converter.

17. The method of claim 16, further comprising:
integrating an output of the sigma-delta converter to create the value calculated from the voltage.

18. The method of claim 16, wherein activating includes providing a signal from the controller to a gate of a silicon controlled rectifier within the current crowbar.

* * * * *